United States Patent [19]
Kolomeitsev et al.

[11] Patent Number: 5,934,430
[45] Date of Patent: Aug. 10, 1999

[54] ELECTRICALLY OPERATED CLUTCH

[75] Inventors: Sergei F. Kolomeitsev, Saline, Mich.; Troy S. Reinoehl, Ashley, Ind.; J. Michael Lewis, Corunna, Ind.; Michael Lee Bassett, Auburn, Ind.; Rock LeRoy Hartshorn, Hayward, Wis.

[73] Assignee: Eaton Corporation, Cleveland, Ohio

[21] Appl. No.: 08/879,299

[22] Filed: Jun. 19, 1997

[51] Int. Cl.[6] ................................................. F16D 27/112
[52] U.S. Cl. ........................................... 192/84.6; 192/90
[58] Field of Search ......................... 192/84.6, 90, 13 R; 74/56, 57

[56] References Cited

U.S. PATENT DOCUMENTS

| | | | |
|---|---|---|---|
| 1,635,068 | 7/1927 | Bing | 192/84.6 |
| 2,072,832 | 3/1937 | Weydell | 192/3.56 |
| 3,235,045 | 2/1966 | Pop . | |
| 4,445,600 | 5/1984 | Schmidt . | |
| 4,604,558 | 8/1986 | Hirsch . | |
| 4,648,498 | 3/1987 | Herbulot et al. . | |
| 4,832,164 | 5/1989 | Flotow | 192/111 B |
| 4,865,173 | 9/1989 | Leigh-Monstevens et al. | 192/3.63 |
| 4,890,711 | 1/1990 | Carmillet et al. . | |
| 4,936,428 | 6/1990 | Leigh-Monstevens et al. | 192/111 A X |
| 4,981,202 | 1/1991 | Leigh-Monstevens et. . | |
| 5,279,401 | 1/1994 | Stall . | |

FOREIGN PATENT DOCUMENTS

| | | |
|---|---|---|
| 3908478A1 | 10/1989 | Germany . |
| 4445606A1 | 7/1995 | Germany . |
| 2279124 | 12/1994 | United Kingdom . |

OTHER PUBLICATIONS

PCT Notification Of Transmittal Of The International Search Report Or The Declaration PCT/US98/11887.

*Primary Examiner*—Rodney H. Bonck
*Assistant Examiner*—Saul J. Rodriguez
*Attorney, Agent, or Firm*—Dykema Gossett PLLC

[57] ABSTRACT

A motor vehicle clutch includes an axis of rotation, a pressure plate, a cover, an apply spring, a release bearing, a stator housing, a stator, a rotor, a rotor housing and a plurality of cam followers. The pressure plate is concentric with the axis of rotation. The cover extends radially over the pressure plate. The apply spring is disposed between the cover and the pressure plate and biases the pressure plate away from the cover. The release bearing is concentric with and axially displaceable along the axis of rotation and is connected to the apply spring for selectively deflecting the spring with axial movement. The stator housing is stationary and is concentric with the axis of rotation. The stator is fixed within the stator housing and has a plurality of poles with windings there about. The rotor is also concentric to the axis of rotation and is operably excited by the stator. The rotor housing is fixed to the rotor. The rotor housing has a plurality of cam ramps arcuately disposed about the axis. The cam ramps smoothly increase in axial height in a first arcuate direction of rotation. The cam followers are disposed between the rotor housing and the release bearing and are in axially engagement with the cam ramps.

14 Claims, 5 Drawing Sheets

ELECTRICALLY OPERATED CLUTCH

FIELD OF THE INVENTION

The present invention relates to improvements in clutches and clutch control systems employing motors for displacing the clutch release bearing.

BACKGROUND OF THE INVENTION

Clutches for motor vehicles are typically released by axial displacement of a clutch release bearing connected with an apply spring. The apply spring biases the pressure plate toward the flywheel. The release bearing is either, depending on the clutch configuration, pushed toward or pulled away from the clutch cover to overcome the clutch apply force attributable to the apply spring. The bearing is able to sustain high axial thrust loads. An inner race of the bearing rotates with the clutch cover, pressure plate and spring which rotate together as a unit. An outer race of the release bearings does not rotate and is connected to a mechanism used to produce the axial displacement of the bearing. A very common mechanism for axially displacing a release bearing is a pivotably mounted release yoke or release fork in engagement with the bearing in combination with a linkage connecting the yoke with a driver operated clutch pedal. When the clutch pedal is depressed, the release yoke is pivoted, axially displacing the release bearing against the force of the force of the apply spring to disengage the clutch. To reengage the clutch, the pedal is released, allowing the apply spring to return the release bearing to the engaged position.

A number of mechanisms have been developed which employ an electric motor for displacing the release bearing. One such mechanism uses an electric motor to pivot the release yoke in place of the clutch pedal and the intervening linkage. While this configuration may be feasible for light duty applications, such as passenger cars, it is difficult to adapt such a system to accommodate the high loads associated with a heavy duty truck clutch. Other clutch systems employ motors concentric with the transmission input shaft. The motor rotatively displaces a lead screw or a nut on a lead screw which rotates as a unit with the rotor of the motor to axially displace the release bearing. The rotating member must complete several rotations of the associated electric motor rotor to achieve the desired axial displacement of the release bearing, making it difficult to precisely control both the amount and the speed of axial displacement. Controlling both of these parameters is important to achieving optimal clutch engagements which are needed to minimize clutch wear. Additionally, the types of motors illustrated are conventional direct current (DC) motors requiring brushes to conduct current to the motor windings. These brushes will eventually wear out, resulting in motor failure.

It is desired to provide a motor vehicle clutch employing a release bearing displacement mechanism which is electrically actuated and is of simple design, highly reliable, and precisely controllable.

SUMMARY OF THE INVENTION

A motor vehicle clutch includes an axis of rotation, a pressure plate, a cover, an apply spring, a release bearing, a stator housing, a stator, a rotor, a rotor housing and a plurality of cam followers. The pressure plate is concentric with the axis of rotation. The cover extends radially over the pressure plate. The apply spring is disposed between the cover and the pressure plate and biases the pressure plate away from the cover. The release bearing is concentric with and axially displaceable along the axis of rotation and is connected to the apply spring for selectively deflecting the spring with axial movement. The stator housing is stationary and is concentric with the axis of rotation. The stator is fixed within the stator housing and has a plurality of poles with windings there about. The rotor is also concentric to the axis of rotation and is operably excited by the stator. The rotor housing is fixed to the rotor. The rotor housing has a plurality of cam ramps arcuately disposed about the axis. The cam ramps smoothly increase in axial height in a first arcuate direction of rotation. The cam followers are disposed between the rotor housing and the release bearing and are in axially engagement with the cam ramps.

The inventive clutch has a release bearing displacement mechanism which is simple in design, highly reliable, and precisely controllable.

DETAILED DESCRIPTION OF THE PERFERRED EMBODIMENTS

Figure 1:
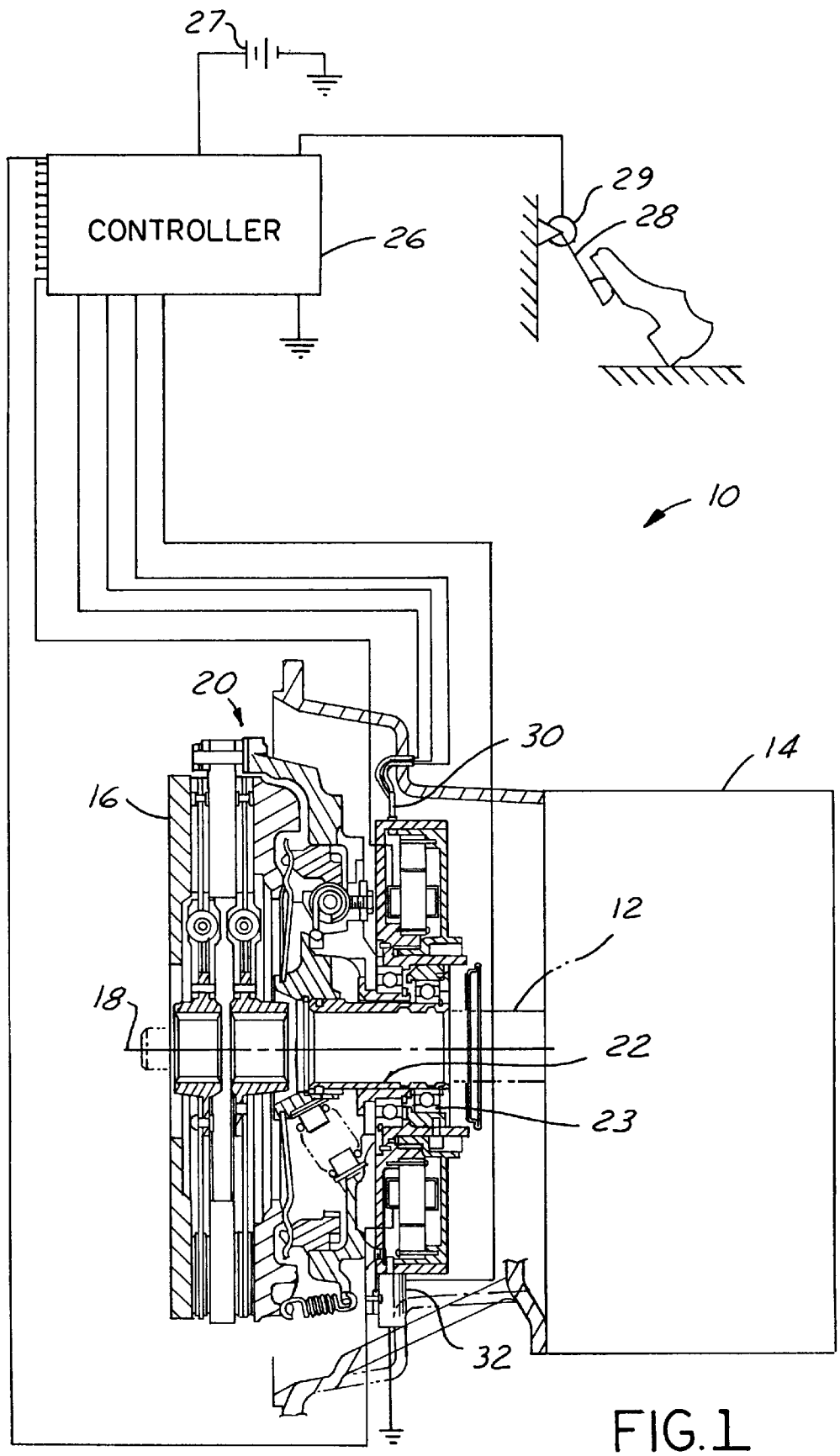
FIG. 1 is a schematic diagram of a clutch control system.

A motor vehicle clutch control system 10 is used to link a input shaft 12 of a transmission 14 shown schematically in FIG. 1 with an engine flywheel 16 which rotates as a unit with a crankshaft of a motor vehicle engine (not shown). Both flywheel 16 and input shaft 12 rotate about a common axis of rotation 18.

The clutch control system includes a heavy duty pull-type friction clutch 20. However, friction clutch 20 could alternatively be of the push style. Friction clutch 20 includes a release sleeve 22 and a release bearing 23, both centered over transmission input shaft 12. A clutch actuating motor or more simply the clutch motor 24 engages release bearing 23 and is also centered over transmission input shaft 12 concentric with axis 18. The type of clutch motor employed is similar to stepper motors used in control systems.

An electronic controller 26 is electrically connected to clutch motor 24 as well as being connected to a battery 27 which serves as an electrical power source. A pivotably mounted clutch pedal 28 has a rotary displacement transducer 29 electrically connected to controller 26. Three displacement sensors 30, such as magnetic pickups or hall effect sensors, are mounted to the clutch motor 24 and electrically connected to controller 26 to determine the magnitude of rotation, the speed of rotation, and the direction of rotation.

Figure 2:
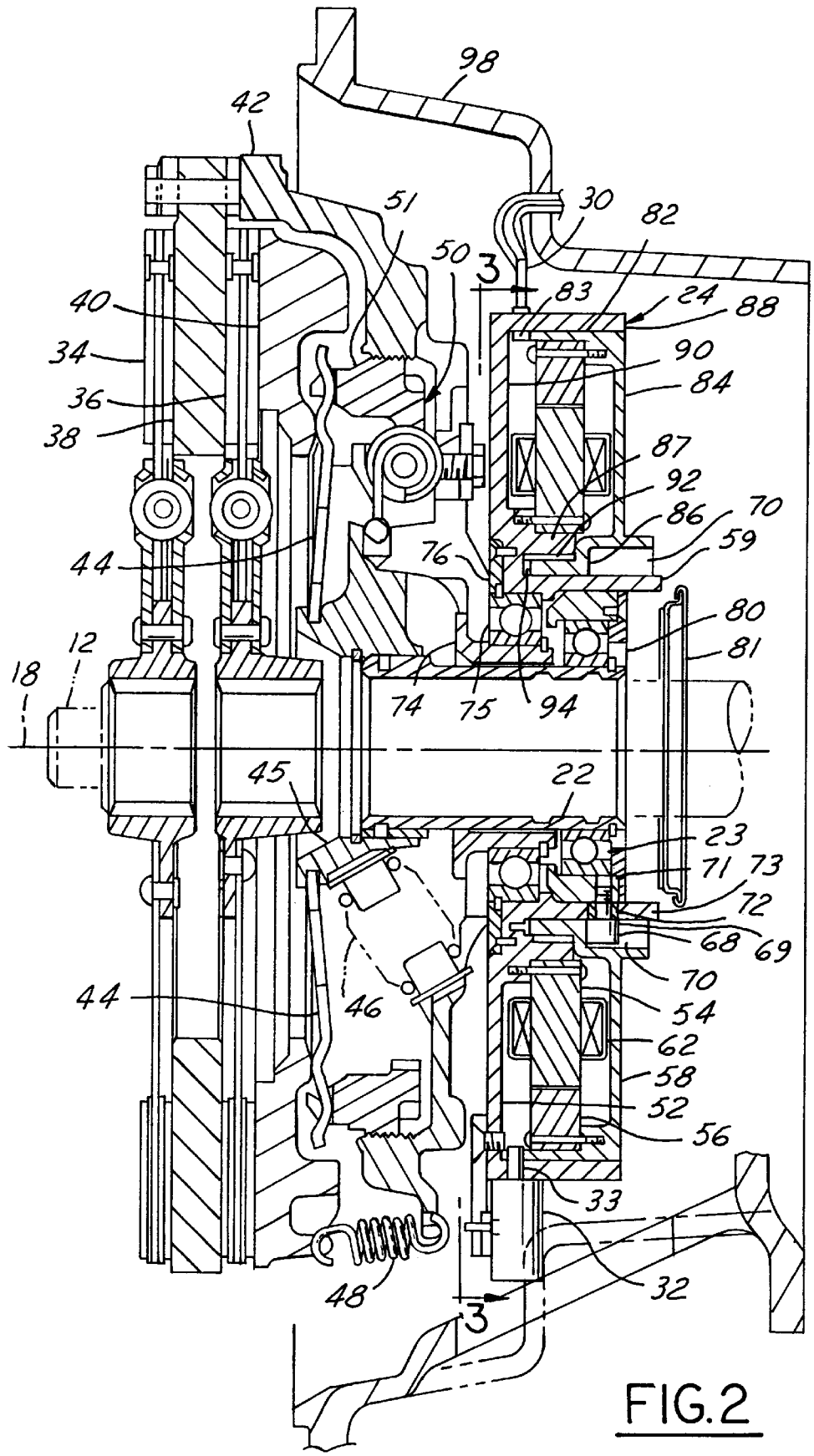
FIG. 2 is a sectional side view of a clutch in the direction of arrows 2 of FIG. 3.

As best shown in FIG. 2, a push-type solenoid 32 having an axially extending engagement pin 33 is electrically connected to controller 26 for operation thereby. Clutch 20 has first and second friction disks 34 and 36 which an intermediate plate 38 disposed therebetween, all being aligned concentric with axis 18. First friction disk 34 is adjacent both flywheel 16 and intermediate plate 38. Second friction disk 36 is disposed between intermediate plate 38 and pressure plate 40. A cast cover 42 is fixed to flywheel 16 and is disposed over first friction disk 34, intermediate plate 38, second friction disk 36 and pressure plate 40.

Radially oriented levers 44 have a radial inner end engaging release sleeve retainer 45 which is fixed to release sleeve 22 and bearing 23 for unitary axial movement therewith, and a radial outer end engaging a pivot point of cover 42. An intermediate fulcrum point of lever 44 engages pressure plate 40. A plurality of apply springs 46, with only one being shown, are disposed between cover 42 and release sleeve retainer 45, biasing retainer 45 toward flywheel 16, causing levers 44 to press pressure plate 40 against friction disk 36 in the direction of flywheel 16. When release bearing 23 is pulled, or moved to the right of FIG. 2, pressure plate 40 is unloaded, allowing pressure plate biasing springs 48 to pull pressure plate 40 away from flywheel 16.

An adjusting mechanism 50 including an adjusting ring portion 51 of cover 42 provides compensation for wear of friction disks 34 and 36 by moving axially leftward to maintain a relative constant amount of release bearing travel to produce the desired clutch engagement and disengagement.

Clutch motor 24 includes a stator housing 52 to which a stator 54 is fixed by a plurality of screws. A rotor 56 is disposed radially outwardly of stator 54 and is fixed to a rotor housing 58 by a plurality of screws. Rotor housing 58 and stator housing 52 protectively enclose stator 54 and rotor 56.

Stator 54 is fixed to an axially extending inner collar 59 of stator housing 52. Stator 54 has twelve stator poles 60, best shown in FIG. 3, with stator windings 62 wound thereabout. Each stator pole 60 has five stator teeth 64 disposed at a radially outermost circumference of stator 54. It should be appreciated that the precise number of poles and teeth can be varied as is appropriate for the specific design. Similarly, rotor 56 has sixty-eight rotor teeth 66 evenly spaced around a radially inner circumference of rotor 56, radially proximate to stator teeth 64.

Four cam followers 68 are fixed with respect to release bearing 23. Each cam follower 68 has a roller head 69 engaging a cam surface 70. A threaded portion of cam follower 68 threadably engages a release bearing housing 71 engaging an outer race of release bearing 23. A shank portion of cam follower 68 disposed between the threaded portion and the roller head 69 has a bushing 72 disposed thereabout. Bushing 72 is slidably disposed in cam follower slot 73 which has a width approximately equal to that of bushing 72 and axially extends into the inner collar 59 of stator housing 52.

Apply springs 46 bias release bearing 23, and therefore cam followers 68, toward flywheel 16. The roller heads 69 of cam followers 68 are resultantly biased against cam surfaces 70. When rotor 56 and rotor housing 58 rotate relative to stator 54 and stator housing 52, cam followers 68 are axially displaced within cam follower slots 73 as roller heads 69 are displaced along cam surface 70.

Mounting sleeve 74 is affixed to cover 42 for rotation therewith. A carrier bearing 75 is disposed between mounting sleeve 74 and stator housing 52 to facilitate the relative rotation therebetween, and to maintain motor 24 concentric with axis 18. A bearing retainer 76 disposed on a flywheel side of stator housing 52 maintains an outer race of carrier bearing 74 in engagement with stator housing 52.

A clutch brake disk 80 is disposed on a transmission side of release bearing 23 for selective engagement with a clutch brake rotor 81 splined to transmission input shaft 12.

An axially extending, radially outer collar 82 of rotor housing 58 has a plurality of notches 83 and also serves to position and center rotor 56 which is disposed radially inwardly thereof, and mounted thereto. A radial flange portion 84 of rotor housing 58 extends radially inwardly from outer collar 82 to an inner wall circumscribing cam surface 70 and defining an axially extending inner collar 86 of rotor housing 58. Axially extending radially inner collar 86 of rotor housing 58 is radially disposed between inner axially extending collar 59 of stator housing 52 and a radially axially extending intermediate collar 87 concentric with collar 59. A radial flange portion 90 of stator housing 52 extends radially outwardly from intermediate collar 87 to an axially extending outer collar 88 of stator housing 52 to close a front end of motor 24. A PERMAGLIDE 92 bearing is radially disposed between the inner collar 86 of rotor housing 58 and intermediate collar 87. A PERMAGLIDE thrust washer 94 is axially disposed between an end of radially inner lip portion 86 and a bottom of the channel defined by inner and intermediate collars 59 and 87.

Figure 3:
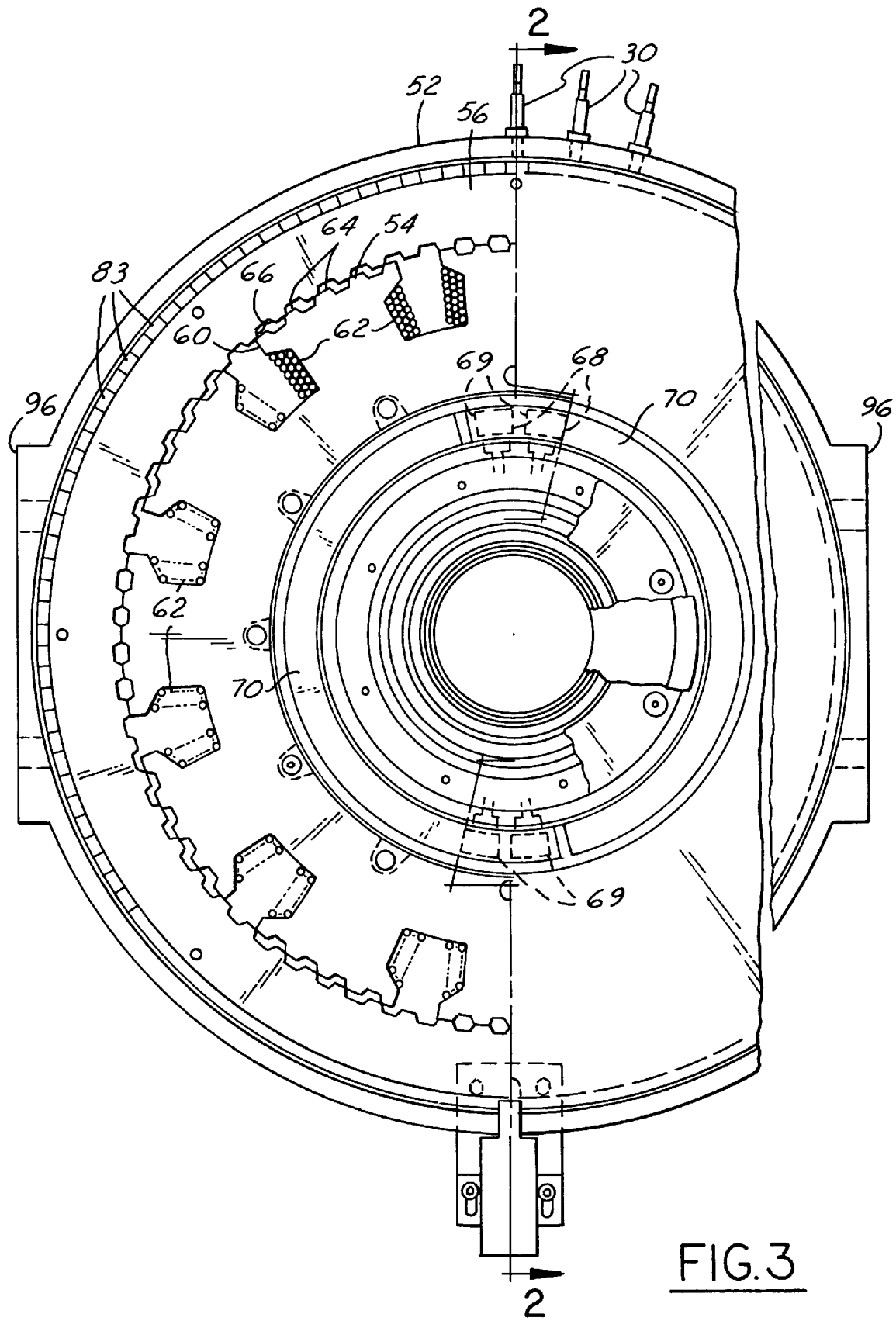
FIG. 3 is an axially oriented end view of a clutch motor.

Mounting bosses 96 are formed on the sides of stator housing 52 as best shown in FIG. 3. Mounting bosses 96 receive screws passing through the transmission housing which fix stator housing 52 in place relative to a clutch housing 98.

The invention operates in the following manner. To release the clutch, the clutch pedal 28 is depressed by the driver. The rotary displacement transducer 29 provides a signal proportional to the displacement of pedal 28 to the controller 26. Controller 26 sequentially energizes windings 62 to cause rotor 56 to rotate. Sensors 30 provide signals to controller 26 which controller 26 uses to determine the direction and magnitude of relative rotor 56 to stator 54 displacement. As the slope of cam surface 70 is constant, the resultant axial displacement of cam followers 68 produced by the relative rotation shifts linearly in direct proportion to the amount of rotation. Approximately 12.7 mm (0.50 inches) of axial displacement is needed to provide clutch disengagement. As cam follower 68 moves up cam surface 70 to increase the rightward displacement of release bearing 23, release sleeve retainer 45 moves axially therewith, pivoting lever 44 away from pressure plate 40. Disengagement is achieved when release sleeve retainer 45 has moved the approximately 12.7 mm (0.50 inches). When it is necessary to bring transmission input shaft 12 to a complete stop, as when shifting into first or reverse gears which are typically not synchronized, approximately 1.27 mm (0.05 inches) of additional release bearing travel is required. This additional travel brings stationary clutch brake disk 80 into contact with clutch brake rotor 81 which is rotatably fixed to input shaft 12 through its splines.

Each time the clutch is actuated, the wear compensator 50 adjusts for facing wear. Once facing wear has exceeded a pre-determined amount, the adjusting ring is advanced and the position of the release sleeve retainer 45, release sleeve 22 and release bearing 23 are returned to normal operating conditions. This automatic adjusting feature facilitates the use of displacement control of release bearing 23 to effect consistent releases and engagements of the clutch.

When the driver releases the clutch pedal 28, the rotary displacement transducer 29 produces a signal communicated to the controller 26. Controller 26 resultantly varies its output signals to windings 62 to reverse motor 24, backing cam followers 68 down cam surface 70 to the engaged position.

Solenoid 32 is rigidly mounted to stator housing 52, with its axially extending engagement pin 33 passing through the axially extending collar portion 88. Solenoid 32 is selectively actuated by controller 26 to cause pin 33 to engage one of notches 83 when release bearing 23 is in the release position for a predetermine amount of time, allowing current to the motor windings to be turned off.

The use of three sensors to detect relative rotation between stator housing 52 and the rotor housing 58 enables controller 26 to monitor both direction and speed of relative displacement, as well as the amount of relative displacement. This information is used by controller 26 to determine the bearing position corresponding to where reengagement is occurring, and is updated to enable controller 26 to optimize clutch engagements by allowing a minimum of slippage during engagements which in turn minimizes the wear of the friction disks and increases the life of the clutch.

Figure 4:
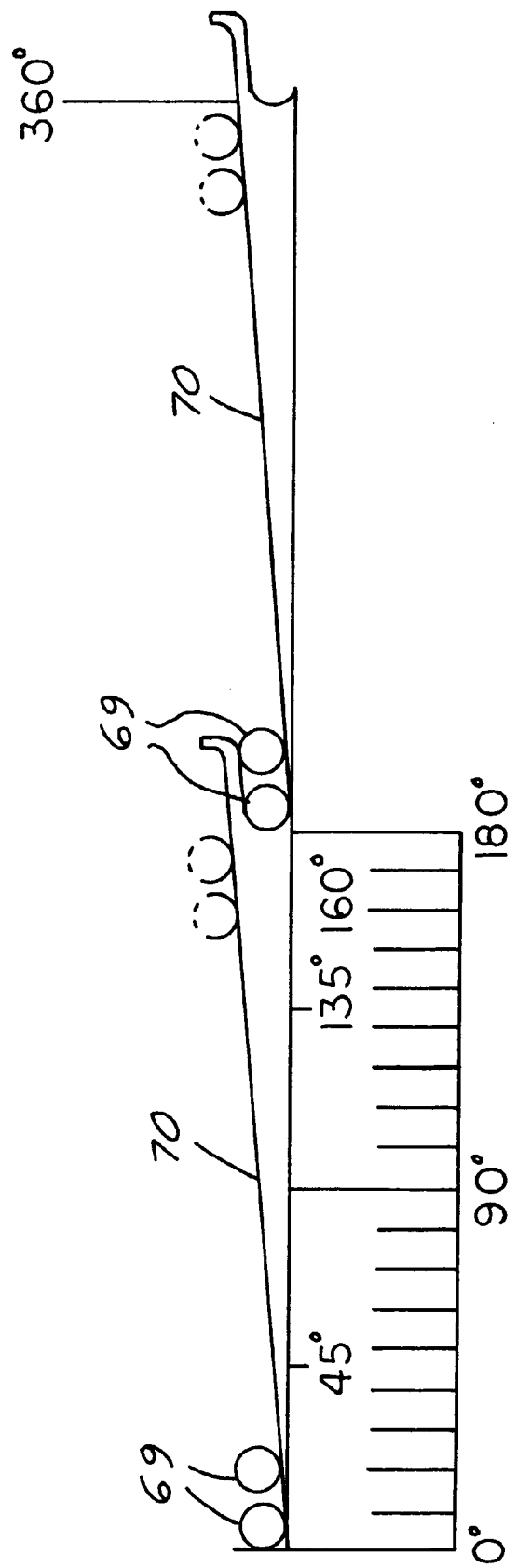
FIG. 4 is a schematic diagram of uncoiled cam ramps.

The relationship between the amount of axial displacement of the release bearing 23 and the amount of relative rotor 56 to stator 54 rotation is established by the slope of cam surface 70 as shown in FIG. 4. However, the total available displacement is a function of both the slope and the maximum available relative rotation. In the present disclosure, that relative rotation is limited to 180°. However, it is possible to increase the amount of available rotation by having overlapping cam surfaces. It is also possible to shorten the amount of relative rotation by employing more sets of cams and cam surfaces, such as three or four, instead of the present two.

Figure 5:
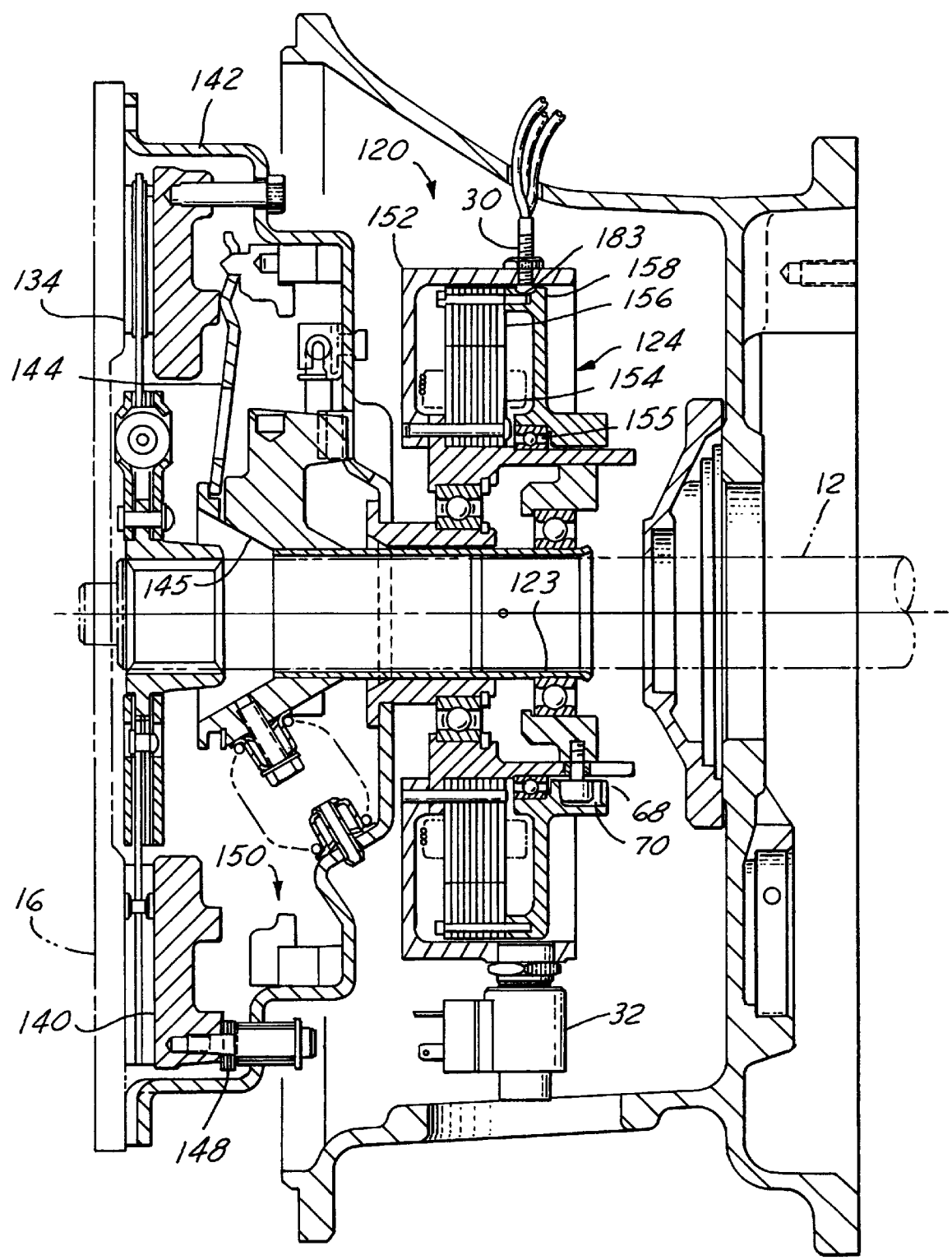
FIG. 5 is a sectional side view of an alternative embodiment of the clutch.

An alternative embodiment to the clutch shown in FIG. 2 is found in FIG. 5. Clutch 120 is better suited for use in medium duty applications, whereas clutch 20 is better suited for heavy duty applications. Clutch 120 employs a single friction disk 134 and a stamped cover 142. The pressure plate 140 accordingly has a slightly different configuration than pressure plate 40. Levers 144 are disposed between cover 142 and a release sleeve retainer 145. Apply springs 146 are disposed between release sleeve retainer 145 and cover 142 biasing retainer 145 toward friction disk 134. A leaf-type pressure plate biasing spring 148 is used to bias pressure plate 140 toward cover 142 when the clutch pressure plate load has been released. An alternative adjusting mechanism 150 employing a pair of ramped cams, as described in U.S. Pat. No. 5,566,804 and which is hereby incorporated by reference, is disposed between a radially outer end of levers 144 and cover 142.

Clutch motor 124 is substantially similar to clutch motor 24. Stator housing 152 is now formed in two parts. Screws attaching stator 154 to an inside diameter portion of stator housing 152 also fix an outside diameter portion of stator housing 152 thereto. The PERMAGLIDE bearings of the first embodiment have been replaced with a ball bearing 155 disposed between stator housing 152 and rotor housing 158. Rotor housing 158 has rotor 156 mounted thereto. Rotor 156 is fastened to an end of rotor housing 158, and is itself radially proximate to an outer collar portion of stator 154. Stator housing 152 and rotor housing 158 together enclose stator 154 and rotor 156, protecting them from the contamination usually associated with a clutch.

Cam followers 68 engage cam surfaces 70 the same as in the first embodiment. Notches 183 are placed in a more rearwardly located position on rotor housing 158, and, as with notches 83 of the first embodiment, serve both to excite sensors 30 and serve as a receptacle for axially extending engagement pin 33 of solenoid 32. Clutch 120 operates in the manner described above for clutch 20.

Preferred embodiments have been disclosed. A worker of ordinary skill in the art would realize, however, that certain modifications would come within the teaching of this invention. For example, it may be advantageous to the assembly of the clutch to manufacture several components which rotate in unison as a single piece, or alternatively, to fabricate them as several pieces. It should also be appreciated that other configurations can be used for the rotor and stator, particularly with respect to the number of teeth and the number of poles employed. It should further be appreciated that, although the presently disclosed embodiments apply to angle spring clutches, and in particular pull style angle spring clutches, the same invention can be applied to diaphragm spring clutches and to push style clutches. The following claims should be studied in order to determine the true scope and content of the invention.

we claim:

1. A control system for actuating a clutch comprising:
   an axis of rotation;
   an annular pressure plate concentric with the axis of rotation;
   a cover extending radially over the pressure plate;
   an apply spring disposed between the cover and the pressure plate biasing the pressure plate away from the cover;
   a release bearing concentric with and axially displaceable along the axis of rotation and connected with the apply spring for selectively deflecting the spring with axial movement;
   a fixed stator housing concentric with the axis of rotation;
   a stator fixed within the stator housing and having a plurality of poles with windings thereabout;
   a rotor disposed concentric to the axis or rotation and operably excited by the stator;
   a rotor housing fixed to the rotor, the rotor, housing having a plurality of cam ramps arcuately disposed about the axis and the cam ramps smoothly increasing in axial height in a first direction of rotation about the axis;
   a plurality of cam followers disposed between the rotor housing and the release bearing in axial engagement with the cam ramps;
   a plurality of sensors fixed relative to the stator and disposed proximate to the rotor for sensing rotation thereof; and
   a controller electrically connected to the sensors and to the windings controlling the indexing of the rotor wherein the rotor is selectively rotatably indexed to locate the release bearing in a desired axial position.

2. A clutch control system as claimed in claim 1 wherein the cam ramps are configured to provide an amount of axial displacement of the release bearing sufficient to disengage the clutch with no more than approximately 180° of relative rotor to stator rotation.

3. A clutch control system as claimed in claim 1 wherein the cam followers have a roller head engaging the cam ramps.

4. A clutch control system as claimed in claim 1 wherein the cam followers extend radially from the release bearing to engage the cam ramps.

5. A clutch control system as claimed in claim 1 further comprising a solenoid mounted to the stator housing and an engagement selectively displaced by the solenoid between an engaged position and a disengaged position and in the engaged position selectively engaging the rotor housing to prevent rotation of the rotor and rotor housing and the solenoid being electrically connected to the controller wherein the solenoid is used to rotatively lock the rotor housing to the stator housing when the release bearing is at a desired axial position.

6. A clutch control system as claimed in claim 5 wherein the stator housing has a radially axially extending outer collar an axially extending outer collar of the rotor housing, with the solenoid being fixed to the outer collar of the stator housing and the pin selectively engaging one of the notches in the rotor housing.

7. A clutch control system as claimed in claim 1 wherein a clutch brake is disposed on a side of the release bearing opposite the cover between the release bearing and a transmission.

8. A motor vehicle clutch comprising:

an axis of rotation;

an annular pressure plate concentric with the axis of rotation;

a cover extending radially over the pressure plate;

an apply spring disposed between the cover and the pressure plate biasing the pressure plate away from the cover;

a release bearing concentric with and axially displaceable along the axis of rotation and connected with the apply spring for selectively deflecting said spring with axial movement;

a fixed stator housing concentric with the axis of rotation;

a stator fixed within the stator housing and having a plurality of poles with windings thereabout;

a rotor disposed concentric to the axis of rotation and operably excited by the stator;

a rotor housing fixed to the rotor, the rotor housing having a plurality of cam ramps arcuately disposed about the axis and the cam ramps smoothly increasing in axial height in a first direction of rotation about the axis; and a plurality of cam followers disposed between the rotor housing and the release bearing in axial engagement with the ramp surface, wherein rotative indexing of the rotor relative to the stator axially displaces the release bearing.

9. A clutch as claimed in claim 8 wherein the cam ramps are configured to provide an amount of axial displacement of the release bearing sufficient to disengage the clutch with no more than approximately 180° of relative rotor to stator rotation.

10. A clutch as claimed in claim 8 wherein the cam followers have a roller head engaging the cam ramps.

11. A clutch as claimed in claim 8 wherein the cam followers extend radially from the release bearing to engage the cam ramps.

12. A clutch as claimed in claim 8 further comprising a solenoid mounted to the stator housing and an engagement pin selectively displaced by the solenoid between an engaged position and a disengaged position and in the engaged position selectively engaging the rotor housing to prevent rotation of the rotor and rotor housing wherein the solenoid is used to rotatively lock the rotor housing to the stator housing when the release bearing is at a desired axial position.

13. A clutch as claimed in claim 12 wherein the stator housing has an axially extending outer collar engaging an axially extending outer collar of the rotor housing, with the solenoid being fixed to the outer collar of the stator housing and the pin selectively engaging one of the notches in the rotor housing.

14. A clutch as claimed in claim 8 wherein a clutch brake is disposed on a side of the release bearing opposite the cover between the release bearing and a transmission.

* * * * *